M. A. JOHNSON.
LOCKING DEVICE.
APPLICATION FILED SEPT. 10, 1921.
1,420,926.
Patented June 27, 1922.
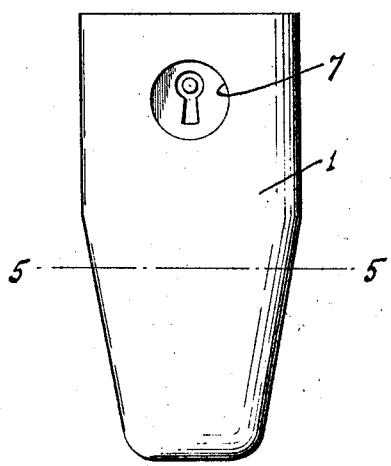
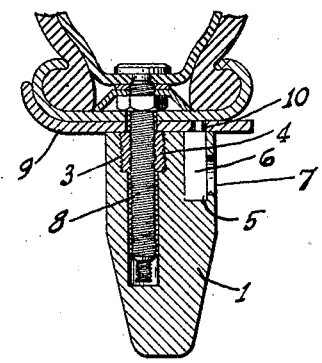
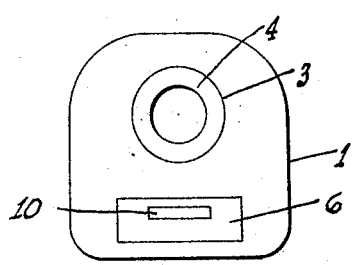
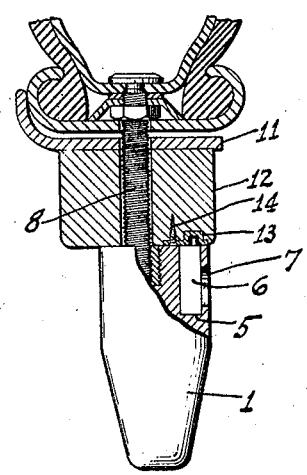
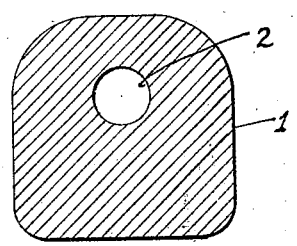
Inventor
Marshall A. Johnson
By Watson E. Coleman Attorney

UNITED STATES PATENT OFFICE.

MARSHALL A. JOHNSON, OF DAYTON, WASHINGTON.

LOCKING DEVICE.

1,420,926.  Specification of Letters Patent.  Patented June 27, 1922.

Application filed September 10, 1921. Serial No. 499,626.

*To all whom it may concern:*

Be it known that I, MARSHALL A. JOHNSON, a citizen of the United States, residing at Dayton, in the county of Columbia and State of Washington, have invented certain new and useful Improvements in Locking Devices, of which the following is a specification, reference being had to the accompanying drawings.

This invention relates to locking devices and more particularly to devices for locking a tire and rim upon a spare tire carrier, or locking a tire directly upon the vehicle wheel to prevent, in both instances, unauthorized removal of the tire.

Another object of the invention is the provision of a device of this character which is simple in construction and which can be carried directly upon the wheel or upon the spare tire at all times and which will effectively prevent the unauthorized removal of the tire.

Further objects of the invention will appear as the following specific description is read in connection with the accompanying drawing which forms a part of this application and in which:

Figure 1 is a side elevation showing one embodiment of my invention,

Figure 2 is a vertical sectional view taken therethrough showing the same locking a tire upon a tire carrier, Figure 3 is a view similar to Figure 2 showing the locking device arranged for securing a tire upon a vehicle wheel, Figure 4 is an end view of the device removed, and Figure 5 is a section on the line 5—5 of Figure 1.

Referring more particularly to the drawing, 1 represents a block or casing of any suitable material which is provided with a longitudinally extending bore or socket 2, the outer end of which is somewhat enlarged and has secured therein by the external threads 3 a sleeve 4 which is also internally threaded for a purpose to be hereinafter described. The casing also has running parallel with the bore 2, a socket 5 in which a suitable lock 6 is secured, the key hole thereof being exposed through an opening 7 formed in the side of the casing in communication with the socket 5. The structure thus described constitutes my improved lock, and as used in Figure 2, the sleeve 4 is threaded upon a valve stem 8 which projects through the spare tire carrier 9, as shown. When the inner end of the casing or block 1 abuts the spare tire carrier, the bolt of the lock is shot into a slot 10 formed in the tire carrier, thus locking the casing or block 1 against rotation in either direction.

In Figure 3 the tire is shown as mounted upon an ordinary wheel rim 11 which is attached to the felly 12. In this instance the felly is provided with a keeper 13 held in position by a screw or other fastening device 14. The valve stem passes through the rim 11 and through the felly, as is usual, and when the block or casing has its sleeve threaded thereon and the casing occupies the inner side of the felly, the bolt of the lock 6 is shot into the keeper and the casing is held against rotation in either direction. It will be noted that so long as the bolt of the lock is in engagement with the keeper 13 or with the slot 10 that the casing cannot be unscrewed from the valve stem, and as the same is much larger than the opening through which the valve stem passes, the tire cannot be removed from the wheel or from the spare tire carrier, or from its own rim.

In a great many of the locks now on the market for locking a tire to a spare tire carrier, the lock is so constructed that it engages only the rim and the tire could be very readily deflated and removed from the rim. The present invention clearly prevents the removal of the tire from its own rim and the tire and its rim from the wheel or spare tire carrier.

What I claim is:

1. The combination with a support for pneumatic tires having a tire valve opening and a bolt receiving opening, and a tire having its valve stem projecting through the tire valve opening of the support, of a casing threaded on the valve stem of the tire and adapted to abut the support, and a lock carried by the casing and having a key operated bolt arranged to engage in the bolt receiving opening of the support and prevent rotation of the casing.

2. The combination with a support for pneumatic tires and a tire having a valve stem passing through the support, of a member threaded on the valve stem and abutting the support, and key operated means carried by the member for engaging the support to prevent rotation of the member on the valve stem.

3. The combination with a support for pneumatic tires and a tire having a valve stem passing through the support, the support being provided adjacent the tire valve stem with a bolt receiving opening, of a member having a bore receiving the valve stem and having threaded engagement therewith adapted to abut the support, said member being provided with a lock having a key operated bolt adapted when projected to engage in the bolt receiving opening to prevent rotation of the member.

4. The combination with a support for pneumatic tires and a tire having a valve stem passing through the support, the support being provided adjacent the valve stem with a bolt receiving opening, of a casing having a bore opening through one end thereof, a sleeve secured within the bore and interiorly threaded for engagement with the valve stem, and a lock carried by the member and having a key operated bolt adapted to engage in the bolt receiving openings of the support to prevent rotation of the member.

In testimony whereof I hereunto affix my signature.

MARSHALL A. JOHNSON.